June 11, 1957  A. EISELE  2,795,049
PRECISION MEASURING INSTRUMENT
Filed Oct. 26, 1953
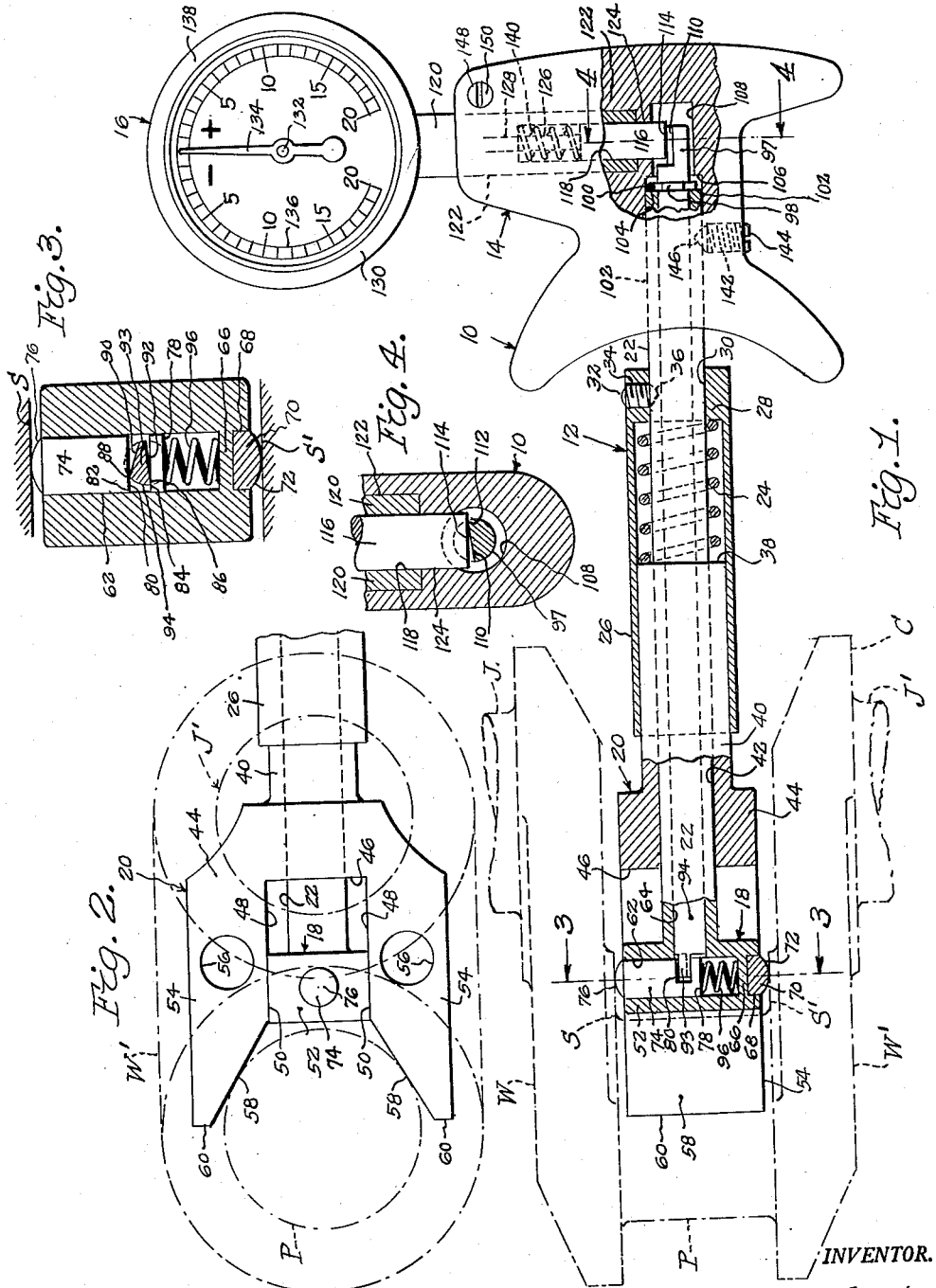
INVENTOR.
BY Andrew Eisele
Barthel + Bugbee
Attys 2,795,049
Patented June 11, 1957

2,795,049
PRECISION MEASURING INSTRUMENT

Andrew Eisele, Detroit, Mich.

Application October 26, 1953, Serial No. 388,267

5 Claims. (Cl. 33—147)

This invention relates to precision measuring instruments and, in particular, to instruments for measuring distances between two opposing surfaces, such as the opposite side walls of a recess.

One object of this invention is to provide a precision measuring instrument for quickly and accurately measuring the distance between two opposing surfaces, and at the same time prevent errors in such measurements arising from the inadvertent tilting of the instrument relatively to the surfaces whose separations are to be measured.

Another object is to provide a precision measuring instrument of the foregoing character which will quickly and accurately measure the distances between parallel surfaces disposed at right angles to the axis of a cylindrical surface throughout the extent of such parallel surfaces such as, for example, the distance between the cheek surfaces adjacent the crank pin of the crankshaft of an internal combustion engine.

Another object is to provide a precision measuring instrument of the foregoing character wherein the instrument is provided with a positioning or locating device which engages the cylindrical surface in such a manner as to position the device and the instrument attached to it accurately at right angles to the axis of the cylindrical surface.

Other objects and advantages of the invention will become apparent during the course of the following description of the accompanying drawings, wherein:

Figure 1 is a top plan view, partly in central horizontal section, through a precision measuring instrument, according to one form of the invention, shown in the position of measuring the distance between the opposite cheek surfaces adjacent the crankpins of an internal combustion engine crankshaft, shown in dotted lines;

Figure 2 is a side elevation of the forward end portion of the measuring instrument of Figure 1, showing the locating device applied to one of the above-mentioned crank pins;

Figure 3 is a vertical cross-section taken along the line 3—3 of Figure 1, showing the measuring pins and their associated mechanism; and Figure 4 is a vertical cross-section taken along the line 4—4 in Figure 1, showing the motion-converting mechanism between the motion-transmitting rod and the dial indicator plunger.

Hitherto it has been difficult to obtain accurate measurements of the distances between spaced parallel surfaces located at the bottom of a depression or in other places which are not easily accessible. In making such measurements by means of a bore gauge, it has been difficult to avoid inaccuracies due to inadvertently tilting the instrument so that the measuring pins are inclined slightly relatively to the surfaces to be measured, rather than accurately perpendicular to them. One example of such a measuring situation is the problem of measuring the separations of the cheek surfaces adjacent the opposite ends of a crankpin of an internal combustion engine crankshaft, where it is not easy to detect whether or not the measuring instrument is tilted.

The present invention provides means for accurately aligning the instrument so that its measuring pins are accurately disposed perpendicular to the surfaces, the separations of which are to be measured. The device is shown as applied to the task of measuring the separations of the cheek surfaces at the opposite ends of a crankshaft crankpin, but it is not to be considered as limited to this specific use. For this purpose, the instrument is provided with a locating device which is in the form of a V-block slidably attached to the measuring head of the instrument, which has parallel opposite outer surfaces engaged by corresponding parallel opposite inner surfaces of a notch or recess in the V-block.

Referring to the drawings in detail, Figures 1 and 2 show a precision measuring instrument, generally designated 10, according to one form of the invention as applied to the measurement of the separation of the opposite cheek surfaces S and S' located adjacent the opposite ends of the crankpin P of a crankshaft C having parallel webs W, W' and coaxial journals J, J'. The instrument 10 itself consists generally of a measuring unit, generally designated 12, to which is attached a handle 14 which in turn carries a conventional dial indicator 16. The measuring unit 12 in turn consists generally of a measuring head 18 slidably engaged by a locating device 20 which is yieldingly urged forwardly along the tubular supporting shaft or stem 22 of the measuring head 18 by a helical compression spring 24 mounted within a tubular casing 26 having an end wall 28 which is bored at 30 for the passage of the supporting shaft 22. The casing 26 is secured to the supporting shaft 22 by a set screw 32 threaded through a transverse hole 34 in the end wall 28 and engaging a notch or recess 36 in the supporting shaft 22. One end of the spring 24 engages the end wall 28, whereas its opposite end engages the end surface 38 of a hollow shank 40 having a bore 42 slidably engaged by the supporting shaft 22. The shank 40 terminates in a slidable locating block 44 through which the bore 42 passes into a recess or notch 46 having spaced opposite parallel side surfaces 48 (Figure 2) engaging similarly spaced parallel side surfaces 50 on the block-like body 52 of the measuring head 18. The central recess or notch 46 causes the locating block 44 to have spaced parallel arms 54 having holes 56 therein and also having flared contact surfaces 58 converging inwardly from the ends 60 thereof to a junction with their respective side surfaces 48 of the recess 46.

The measuring head body 52 is provided with a transverse bore 62 (Figures 1 and 3) the axis of which is perpendicular to the axis of a longitudinal bore 64 within the supporting shaft or stem 22. Coaxial with the bore 62 and separated from it by a partition or end wall 66 is a socket 68 in which is seated a fixed measuring pin 70 having a rounded contact surface 72. The fixed measuring pin 70 is preferably of a hard wear-resisting material, such as hardened steel, tungsten carbide or the like.

Reciprocably mounted in the transverse bore 62 of the measuring head body 52 is a movable measuring pin 74 and disposed coaxially with the fixed measuring pin 70. It is apparent from the solid geometry of Figures 1 and 2 that the plane bisecting the angle between the converging surfaces 58 passes through the axis of the measuring pins 70 and 74 and also bisects the space between the plane parallel side surfaces 48. Accordingly, this bisecting plane will continue to pass through the axis of the measuring pins 70 and 74 throughout the reciprocation of the slidable locating block 44. The movable measuring pin 74 has a rounded forward end 76, a rearward end 78, and an intermediate notch 80 extending inwardly from one side thereof. The notch 80 has parallel side walls 82 and 84, the latter being engaged by one of the two sharp edges 86 and 88 at the sides of mutually-inclined surfaces 90 and 92 on the cutaway end 93 of a motion-transmitting rod 94 which is rotatably mounted in the bore 64 within the tubular supporting shaft or stem 22 of the measuring head 18. A helical compression spring 96 located in the transverse bore 62 with its opposite ends engaging the end wall 66 and movable measuring pin end surface 78 respectively, urges the movable measuring pin 74 outwardly from the bore 62 and urges the notch surface 84 thereof into engagement with the sharp edge 86 on the cutaway end 93.

The opposite end portion 97 of the motion-transmitting rod 94 where it emerges from the tubular shaft or stem 22 is provided with an annular groove 98 adapted to receive a snap ring 100. The snap ring 100 is received in the space at the end of a bore 102 within the handle 14 adjacent the end surface 104 of the stem 22 and an annular shoulder 106 between the bore 102 and a counterbore 108 of smaller diameter extending further into the handle 14. The end portion 97 is cut away approximately diametrically to provide a contact surface 110 having a sharp edge 112 urged into engagement with the flat end surface 114 of the dial indicator plunger 116 by the rotation of the motion-transmitting rod 94 in response to the thrust of the spring 96 against the movable measuring pin 74. The plunger 116 is reciprocably mounted in a bore 118 within the tubular stem 120 of the dial indicator 16, the stem 120 in turn being seated in a transverse bore or socket 122, the axis of which is perpendicular to the axis of the bore 102 and counterbore 108. A reduced diameter bore 124 leading from the transverse bore or socket 122 into the counterbore 108 slidably receives the plunger 116 of the dial indicator 16.

The dial indicator 16 is of conventional construction and its details are well-known to those working in the mechanical industries and form no part of the present invention. For purposes of illustration and demonstration, the dial indicator plunger 116 is shown as having a reduced diameter portion 126 which passes through a reduced diameter bore 128 coaxial with the bore 118 into the interior of the dial indicator casing 130, where it engages conventional motion-multiplying mechanism, such as precision gearing, which multiplies the reciprocating motion of the plunger 116 and transforms it into rotary motion of a needle shaft 132 carrying a needle or pointer 134 registering with a circular or arcuate graduated scale 136. The scale 136 is conveniently mounted upon a rotatable dial 138 which is rotated by hand to set the instrument at zero. A compression spring 140 encircles the reduced diameter portion 126 of the plunger 116 and urges the plunger 116 downward into engagement with the cutaway portion or surface 110 on the end portion 97 of the motion-transmitting rod 94.

The portion of the handle 14 adjacent the stem 22 is provided with a transverse threaded bore 142 opening into the bore 102 and receiving a headless set screw 144 engaging the notch or recess 146 in the stem 22 to lock the latter firmly in position. The portion of the handle 14 near the dial indicator stem 120 and bore 122 is split (not shown) and provided with a transverse threaded hole 148 receiving a clamping set screw 150.

In the operation of the invention, the user inserts the locating block 44 between the webs W, W' of the crankshaft C to be measured, in the manner shown in Figure 1, pushing the instrument 10 inward until the flared surfaces 58 engage the cylindrical surface of the crankpin P and have contact with it along the entire width of the surfaces 58. When this is done, and such complete contact is obtained, the axis of the transverse bore 62 and movable measuring pin 74 is positioned accurately parallel to the axis of the cylindrical crankpin P and therefore accurately perpendicular to the cheek surfaces S, S' on the crank webs W, W' adjacent the opposite ends of the crankpin P. Even though the flared surfaces 58 of the locating device 20 have come to rest against the crankpin P in the manner described above, the operator continues to push the instrument inward by means of the handle 14, causing the measuring unit 12 to move inward relatively to the locating device 20, so that the measuring head 18 passes between the cheek surfaces S, S', which are thereby engaged by the rounded surfaces 72 and 76 of the fixed and movable measuring pins 70 and 74 respectively. The movable measuring pin 74 is pushed inward into the measuring head body 52, engaging the sharp edge 88 of the cutaway portion 93 of the motion-transmitting rod 94, compressing the spring 96 and rotating the motion-transmitting rod 94.

The rotation of the motion-transmitting rod 94 consequently rotates the cutaway end portion 97 thereof, causing the sharp edge 112 of the surface 110 to engage the end surface 114 of the plunger 116 and push the latter outward in the bore 118, compressing the spring 140. This action is transmitted to the motion-converting mechanism within the dial indicator 16, correspondingly rotating the needle shaft 132 and causing the needle 134 to sweep in an arcuate path over the graduated scale 136 so as to indicate the deviation from the standard separation established for the cheek surfaces S and S'.

The same instrument may be used to measure the distance between the parallel side surfaces of a recess, such as a groove, notch or depression in a manner analogous to the procedure described above.

What I claim is:

1. A gauge adapted to be used with a dial indicator for measuring the separation of spaced parallel surfaces interconnected by a connecting surface, said gauge comprising a hollow measuring head structure adapted to be connected to said dial indicator, a motion-transmitting member movably mounted within said structure and operatively engaging said dial indicator, a pair of measuring elements mounted coaxially in said structure transversely to said motion-transmitting member and engageable with said parallel surfaces, one of said elements being reciprocably mounted in said structure and operatively engaging said motion-transmitting member, and a locating device having a body reciprocably mounted on said structure, said device having spaced arm portions extending on opposite sides of said structure into engagement with said connecting surface, said arm portions having contact surfaces engageable with said connecting surface and converging inwardly toward said structure, the plane bisecting the angle between the converging contact surfaces passing through the axis of said measuring elements, said structure and said body including guide means disposed therebetween for maintaining said bisecting plane in coincidence with said measuring element axis throughout the reciprocation of said body relatively to said structure.

2. A gauge adapted to be used with a dial indicator for measuring the separation of spaced parallel surfaces interconnected by a connecting surface, said gauge comprising a hollow measuring head structure adapted to be connected to said dial indicator, a motion-transmitting member movably mounted within said structure and operatively engaging said dial indicator, a pair of measuring elements mounted coaxially in said structure transversely to said motion-transmitting member and engageable with said parallel surfaces, one of said elements being reciprocably mounted in said structure and operatively engaging said motion-transmitting member, and a locating device having a body reciprocably mounted on said structure, said device having spaced arm portions extending on opposite sides of said structure into engagement with said connecting surface, said structure and said arm portions having spaced parallel bearing surfaces slidably engaging one another, said arm portions having contact surfaces converging inwardly toward said structure, the plane bisecting the angle between the converging contact surfaces passing through the axis of said measuring elements, said parallel bearing surfaces maintaining said bisecting plane in coincidence with said measuring element axis throughout the reciprocation of said body relatively to said structure.

3. A gauge adapted to be used with a dial indicator for measuring the separation of spaced parallel surfaces interconnected by a connecting surface, said gauge comprising a hollow measuring head structure adapted to be connected to said dial indicator, a motion-transmitting member movably mounted within said structure and operatively engaging said dial indicator, a pair of measuring elements mounted in said structure transversely to said motion-transmitting member and engageable with said parallel surfaces, one of said elements being reciprocably mounted in said structure and operatively engaging said motion-transmitting member, and a locating device having a body reciprocably mounted on said structure, said body having a recess with parallel internal bearing surfaces extending inwardly from one end of said body, said body having contact surfaces extending inwardly from one end thereof to said bearing surfaces.

4. A gauge adapted to be used with a dial indicator for measuring the separation of spaced parallel surfaces interconnected by a connecting surface, said gauge comprising a hollow measuring head structure adapted to be connected to said dial indicator, a motion-transmitting member movably mounted within said structure and operatively engaging said dial indicator, a pair of measuring elements mounted in said structure transversely to said motion-transmitting member and engageable with said parallel surfaces, one of said elements being reciprocably mounted in said structure and operatively engaging said motion-transmitting member, and a locating device having a body reciprocably mounted on said structure, said body having a recess with parallel internal bearing surfaces extending inwardly from one end of said body, said body having contact surfaces extending inwardly from one end thereof to said bearing surfaces, said structure having parallel external bearing surfaces slidably engageable with said internal bearing surfaces.

5. A gauge adapted to be used with a dial indicator for measuring the separation of spaced parallel surfaces interconnected by a connecting surface, said gauge comprising a hollow measuring head structure adapted to be connected to said dial indicator, a motion-transmitting member movably mounted within said structure and operatively engaging said dial indicator, a pair of measuring elements mounted in said structure transversely to said motion-transmitting member and engageable with said parallel surfaces, one of said elements being reciprocably mounted in said structure and operatively engaging said motion-transmitting member, and a locating device having a body reciprocably mounted on said structure, said body having a recess with parallel internal bearing surfaces extending inwardly from one end of said body, said body having contact surfaces extending inwardly from one end thereof to said bearing surfaces, said structure having parallel external bearing surfaces slidably engageable with said internal bearing surfaces, said measuring elements having their axes disposed parallel to said bearing surfaces.

References Cited in the file of this patent

UNITED STATES PATENTS

| | | |
|---|---|---|
| 1,283,997 | Watson | Nov. 5, 1918 |
| 1,794,162 | Flamm | Feb. 24, 1931 |
| 2,268,579 | Eisele | Jan. 6, 1942 |